United States Patent
Lu et al.

(10) Patent No.: US 12,526,895 B2
(45) Date of Patent: Jan. 13, 2026

(54) LIGHT-EMITTING DIODE LIGHTING DEVICE WITH AFTERGLOW-PROOF FUNCTION

(71) Applicant: Xiamen PVTECH Co., Ltd., Fujian (CN)

(72) Inventors: Fuxing Lu, Fujian (CN); Zhirong Lin, Fujian (CN)

(73) Assignee: Xiamen PVTECH Co., Ltd., Xiamen (CN)

( * ) Notice: Subject to any disclaimer, the term of this patent is extended or adjusted under 35 U.S.C. 154(b) by 155 days.

(21) Appl. No.: 18/382,030

(22) Filed: Oct. 19, 2023

(65) Prior Publication Data

US 2024/0407064 A1  Dec. 5, 2024

(30) Foreign Application Priority Data

May 29, 2023 (CN) .......................... 202310617971.X

(51) Int. Cl.
*H05B 45/59* (2022.01)
*H05B 47/23* (2020.01)

(52) U.S. Cl.
CPC ............. *H05B 45/59* (2022.01); *H05B 47/23* (2020.01)

(58) Field of Classification Search
CPC ......... H05B 45/59; H05B 47/23; H05B 45/00
USPC ....................................................... 315/291
See application file for complete search history.

(56) References Cited

U.S. PATENT DOCUMENTS

| | | | | |
|---|---|---|---|---|
| 8,324,820 B2* | 12/2012 | Janning | .................. | H05B 45/42 |
| | | | | 315/185 S |
| 8,841,856 B1* | 9/2014 | Beasley | .................. | H05B 45/44 |
| | | | | 315/253 |
| 9,247,627 B2* | 1/2016 | Han | ........................ | H05B 47/25 |
| 9,313,866 B2* | 4/2016 | Han | ........................ | H05B 47/25 |
| 9,723,701 B2* | 8/2017 | Han | ........................ | H05B 39/00 |
| 10,101,013 B2* | 10/2018 | Leung | ..................... | F21V 23/00 |
| 10,591,143 B2* | 3/2020 | Leung | ..................... | F21V 23/00 |
| 2009/0128042 A1* | 5/2009 | Janning | .................. | H05B 47/23 |
| | | | | 315/122 |
| 2009/0289561 A1* | 11/2009 | Chen | .................... | H05B 45/345 |
| | | | | 315/185 S |
| 2011/0309757 A1* | 12/2011 | Weaver | .................. | H05B 45/24 |
| | | | | 315/188 |

(Continued)

FOREIGN PATENT DOCUMENTS

JP         2012243479 A    12/2012

*Primary Examiner* — Ryan Jager
(74) *Attorney, Agent, or Firm* — Bruce Stone LLP; Joseph A. Bruce

(57) ABSTRACT

A light-emitting diode (LED) device with afterglow-proof function includes a common positive electrode, a common negative electrode and a LED lighting module. The common positive electrode is connected to the positive electrode of an external power source. The common negative electrode is connected to the negative electrode of the external power source. One end of the LED lighting module is connected to the common positive electrode and the other end of the LED lighting module is connected to the common negative electrode. The LED lighting module includes a plurality of LED lighting units connected to each other in series. Each of the LED lighting units includes a light source and a capacitor connected to each other in parallel. The circuit design can realize the afterglow-proof function in order to prevent the afterglow effect of the LED lighting device.

10 Claims, 3 Drawing Sheets

(56) References Cited

U.S. PATENT DOCUMENTS

| | | | | |
|---|---|---|---|---|
| 2014/0125235 | A1* | 5/2014 | van den Berg | H05B 45/48 |
| | | | | 315/185 R |
| 2014/0300286 | A1* | 10/2014 | Han | H05B 39/00 |
| | | | | 315/187 |
| 2014/0300287 | A1* | 10/2014 | Han | H05B 39/00 |
| | | | | 315/188 |
| 2015/0108909 | A1* | 4/2015 | Rupp | H05B 45/46 |
| | | | | 315/193 |
| 2015/0289351 | A1* | 10/2015 | Han | H05B 39/00 |
| | | | | 315/187 |
| 2016/0113098 | A1* | 4/2016 | Han | H05B 47/29 |
| | | | | 315/187 |
| 2016/0123566 | A1* | 5/2016 | Leung | F21V 19/006 |
| | | | | 362/249.14 |
| 2016/0242259 | A1* | 8/2016 | Doorn | H05B 45/48 |
| 2021/0153323 | A1* | 5/2021 | Bakk | H05B 45/3725 |
| 2024/0407064 | A1* | 12/2024 | Lu | H05B 45/59 |

* cited by examiner

LIGHT-EMITTING DIODE LIGHTING DEVICE WITH AFTERGLOW-PROOF FUNCTION

TECHNICAL FIELD

The present invention relates to a light-emitting diode (LED) device, in particular to a LED lighting device with afterglow-proof function.

BACKGROUND

Light-emitting diode (LED) lighting devices have many advantages (such as high efficiency, long service life, high reliability, low energy consumption, etc.), so LED lighting devices have been widely used in various buildings. However, currently available LED lighting devices still have some shortcomings to be improved. For example, the currently available LED lighting devices will have obvious afterglow after being turned off. In addition, LED lighting devices with dimming function or temperature adjustment function (such as plant lamps, etc.) may have multiple lighting modules. When the user turns off one (or more) lighting modules, the user will find that this lighting module also incurs an afterglow effect and cannot be completely turned off. One of the solutions is to use an isolated power supply and not use a Y capacitor, but the electromagnetic compatibility (EMC) circuit will increase the cost of the LED lighting device. Another of the existing solutions is to connect the LEDs in parallel with a resistor, which leads to a decrease in the efficiency of the LED lighting device. The other of the solutions is to use a relay, which also increases the cost of the LED lighting device and occupies the internal space of the LED lighting device. China Patent Publication NO. CN113316284A and China Patent No. CN104969663B disclose circuits with the function of preventing the afterglow effect, but these circuits still cannot effectively solve the above problems in the prior art.

SUMMARY

One embodiment of the present invention provides a light-emitting diode (LED) device with afterglow-proof function, which includes a common positive electrode, a common negative electrode and a LED lighting module. The common positive electrode is connected to the positive electrode of an external power source. The common negative electrode is connected to the negative electrode of the external power source. One end of the LED lighting module is connected to the common positive electrode and the other end of the LED lighting module is connected to the common negative electrode. The LED lighting module includes a plurality of LED lighting units connected to each other in series. Each of the LED lighting units includes a light source and a capacitor connected to each other in parallel.

In one embodiment, the light source includes a plurality of LED connected to each other in series.

In one embodiment, the capacitive reactance of the capacitor is less than the impedance of the LEDs in on state.

In one embodiment, the quantity of the LEDs is an even number.

In one embodiment, the quantity of the LEDs is an odd number.

In one embodiment, the light source is a LED.

In one embodiment, the capacitive reactance of the capacitor is less than the impedance of the LED in on state.

In one embodiment, the capacitor is a multilayer ceramic capacitor.

In one embodiment, the external power source is a utility power.

In one embodiment, the quantity of the LED lighting units of the LED lighting module is greater than 3.

The LED lighting device with afterglow-proof function in accordance with the embodiments of the present invention may have the following advantages:

(1) In one embodiment of the present invention, the LED device with afterglow-proof function, which includes a common positive electrode, a common negative electrode and a LED lighting module. The common positive electrode is connected to the positive electrode of an external power source. The common negative electrode is connected to the negative electrode of the external power source. One end of the LED lighting module is connected to the common positive electrode and the other end of the LED lighting module is connected to the common negative electrode. The LED lighting module includes a plurality of LED lighting units connected to each other in series. Each of the LED lighting units includes a light source and a capacitor connected to each other in parallel. The above circuit design can effectively realize the afterglow-proof function in order to eliminate the afterglow effect of the LED lighting device, which can effectively improve the shortcomings of the prior art.

(2) In one embodiment of the present invention, the circuit design of the LED lighting device can realize the afterglow-proof function so as to prevent the LED lighting device from the afterglow effect, which can effectively optimize the dimming function and the color temperature adjusting function of the LED lighting device. As a result, the LED lighting device can be more comprehensively in application and more flexible in use.

(3) In one embodiment of the present invention, the circuit design of the LED lighting device can be realized by one or more LEDs connected to a capacitor in parallel in order to achieve the afterglow-proof function. Thus, the circuit design of the LED lighting device does not need an isolated power source or a relay, so the cost of the LED lighting device can be significantly reduced. Accordingly, the practicality of the LED lighting device can be effectively enhanced so as to meet actual requirements.

(4) In one embodiment of the present invention, the circuit design of the LED lighting device can be realized by one or more LEDs connected to a capacitor in parallel. This circuit design can achieve the afterglow-proof function with a view to preventing the LED lighting device from the afterglow effect without decreasing the efficiency of the LED lighting device. Accordingly, the LED lighting device can operate in high efficiency, such that the power consumption of the LED lighting device can be reduced. In this way, the LED lighting device can conform to the future development trend.

(5) In one embodiment of the present invention, the design of the LED lighting device is simple, so the LED lighting device can achieve the desired technical effect without significantly increasing the cost. Therefore, the LED lighting device can satisfy the requirements of different applications.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
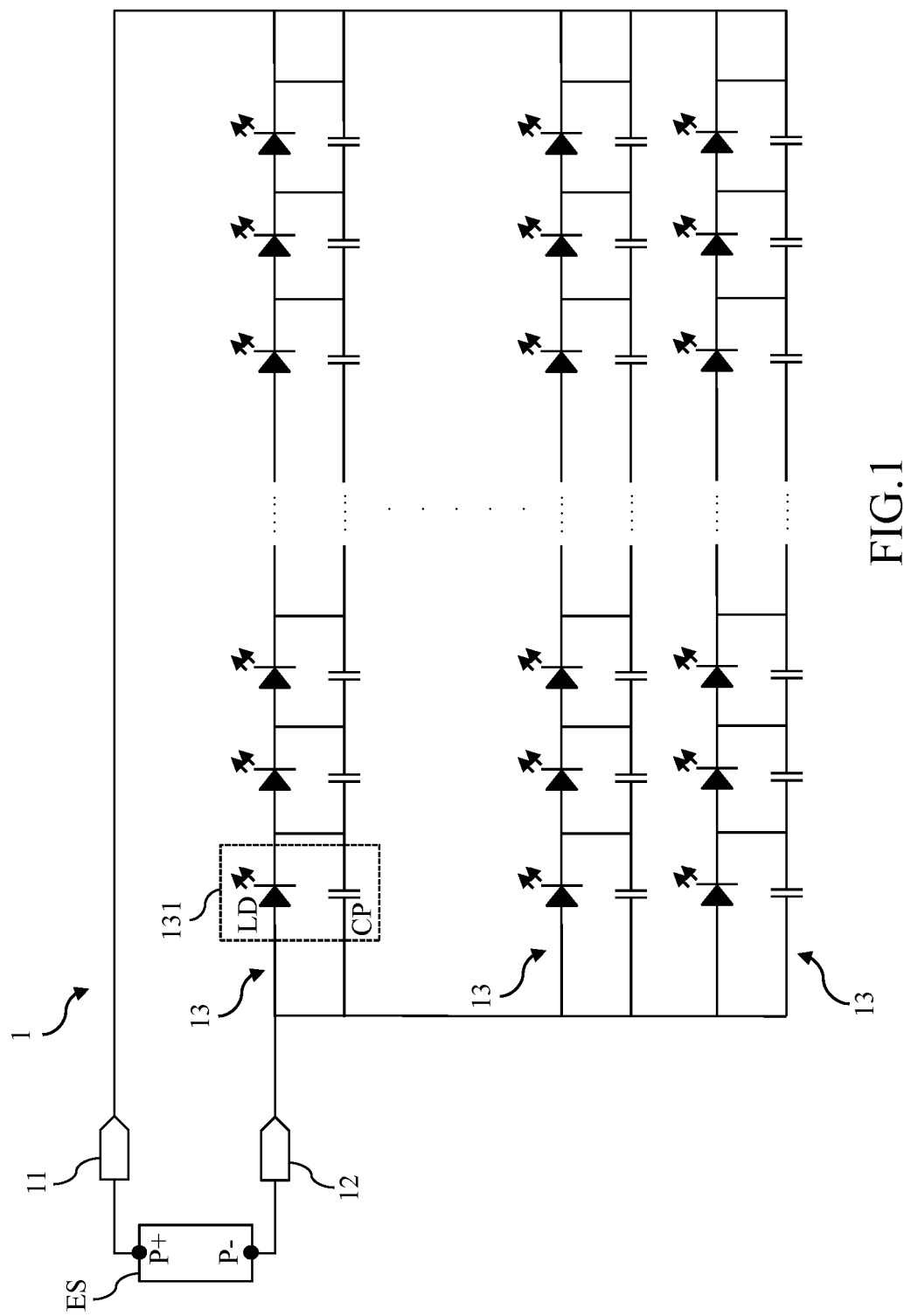
FIG. 1 is the circuit diagram of the light-emitting diode (LED) lighting device with afterglow-proof function in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Please refer to FIG. 1, which is the circuit diagram of the light-emitting diode (LED) lighting device with afterglow-proof function in accordance with one embodiment of the present invention. As shown in FIG. 1, the light-emitting diode (LED) device 1 includes a common positive electrode 11, a common negative electrode 12 and a plurality of LED lighting modules 13.

The common positive electrode 11 is connected to the positive electrode P+ of an external power source ES. In one embodiment, the external power source ES is a utility power. In another embodiment, the external power source ES is a power generator or other similar devices.

The common negative electrode 12 is connected to the negative electrode P– of the external power source ES. The common positive electrode 11 and the common negative electrode 12 of the LED lighting device 1 may be connected to the lamp holder in order to connect to the external power source ES.

One end of each of the LED lighting modules 13 is connected to the common positive electrode 11 and the other end thereof is connected to the common negative electrode 12. Each of the LED lighting modules 13 includes a plurality of LED lighting units 131 connected to each other in series. Each of the LED lighting units 131 includes a light source and a capacitor CP connected to each other in parallel. In the embodiment, the light source is a LED LD and the capacitor CP is a multilayer ceramic capacitor (MLCC). In addition, the capacitive reactance of the capacitor CP is less than the impedance of the LED LD in on state.

It is necessary to make the voltage of the positive electrode of the LED LD be greater than the voltage of the negative electrode of the LED LD so as to turn on the LED LD to emit light, which tends to cause afterglow effect due to the parasitic capacitance. As the voltage of the parasitic capacitance is obtained from the coupling energy of the AC voltage and the ground, so the voltage of the parasitic capacitance is just the AC voltage. If the LED LD is connected to the capacitor CP in parallel, the capacitor CP can be consecutively switched between charging state and discharging state. Thus, if the capacitance of the capacitor CP makes the capacitive reactance of the capacitor CP is less than the impedance of the LED LD in on state, the current will pass through the capacitor CP instead of the LED LD. Accordingly, the LED LD will not incur the afterglow effect.

As set forth above, the LED lighting device 1 includes the common positive electrode 11, the common negative electrode 12 and the LED lighting modules 13. The common positive electrode 11 is connected to the positive electrode P+ of the external power source ES. The common negative electrode 12 is connected to the negative electrode P– of the external power source ES. One end of each of the LED lighting modules 13 is connected to the common positive electrode 11 and the other end thereof is connected to the common negative electrode 12. Each of the LED lighting modules 13 includes the LED lighting units 131 connected to each other in series. Each of the LED lighting units 131 includes the light source and the capacitor CP connected to each other in parallel, and the light source is the LED LD. The above circuit design can effectively realize the afterglow-proof function in order to eliminate the afterglow effect of the LED lighting device, which can effectively improve the shortcomings of the prior art.

Moreover, the circuit design of the LED lighting device 1 can be realized by the LED LD connected to the capacitor CP in parallel in order to achieve the afterglow-proof function. Thus, the circuit design of the LED lighting device 1 does not need an isolated power source or a relay, so the cost of the LED lighting device 1 can be significantly reduced. Accordingly, the practicality of the LED lighting device 1 can be effectively enhanced so as to meet actual requirements. Further, the above circuit design can effectively optimize the dimming function and the color temperature adjusting function of the LED lighting device 1. Therefore, the LED lighting device 1 can be more comprehensively in application and more flexible in use. Via the above circuit design, the LED lighting device 1 can operate in high efficiency, such that the power consumption of the LED lighting device 1 can be reduced. In this way, the LED lighting device 1 can conform to the future development trend.

The embodiment just exemplifies the present invention and is not intended to limit the scope of the present invention; any equivalent modification and variation according to the spirit of the present invention is to be also included within the scope of the following claims and their equivalents.

Figure 2:
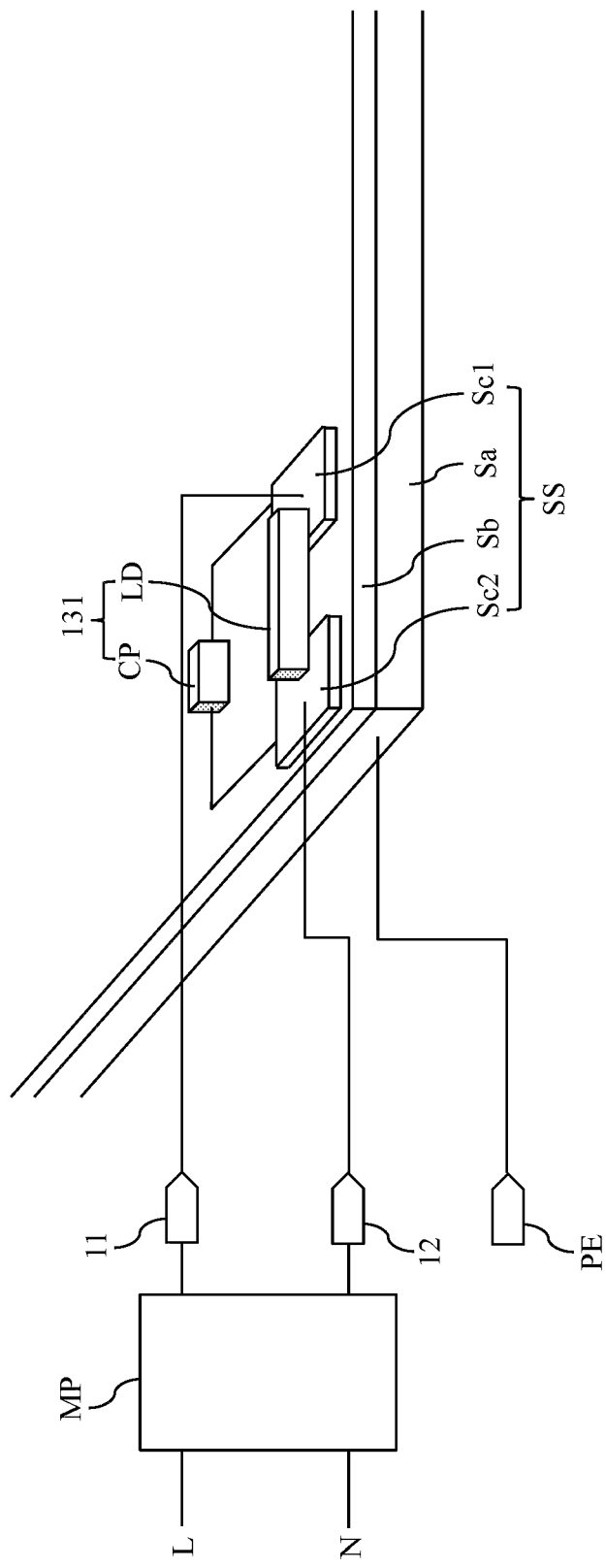
FIG. 2 is the schematic view of the operational mechanism of the LED lighting device with afterglow-proof function in accordance with another embodiment of the present invention.

Please refer to FIG. 2, which is the schematic view of the operational mechanism of the LED lighting device with afterglow-proof function in accordance with another embodiment of the present invention. As shown in FIG. 2, L stands for a live wire, which is the positive electrode P+ of an external power source ES. N stands for a neutral wire, which is the negative electrode P– of the external power source ES. The live wire L and the neutral wire N are connected to a common positive electrode 11 and a common negative electrode 12.

The substrate SS includes a conductive layer Sa (e.g., an aluminum board), an isolating medium layer Sb (e.g., a glass optical fiber board), a plurality of first metal layers Sc1 and a plurality of second metal layers Sc2 (only one first metal layer Sc1 and one second metal layer Sc2 are shown in FIG. 2, which may be cupper foil layers). The isolating medium layer Sb is disposed on the conductive layer Sa, and the first metal layers Sc1 and the second metal layers Sc2 are disposed on the isolating medium layer Sb. The LED lighting units 131 (only one LED lighting unit 131 is shown in FIG. 2) is disposed on the conductive layer Sa.

Each of the LED lighting units 131 includes a LED LD and a capacitor CP. The positive electrode pin of the LED LD is connected to the first metal layer Sc1 and the negative electrode pin of the LED LD is connected to the second metal layer Sc2 one end of the capacitor CP is connected to the first metal layer Sc1 and the other end of the capacitor CP is connected to the second metal layer Sc2.

The common positive electrode 11 and the common negative electrode 12 are connected to the first metal layer Sc1 and the second metal layer Sc2 respectively, and the grounding point PE is connected to the conductive layer Sa.

As described above, the live wire L and the neutral wire N are connected to the common positive electrode 11 and the common negative electrode 12 respectively via the non-isolated power source MP, and the non-isolated power source MP cannot provide the electrical isolating function. Therefore, if only one of the live wire L and the neutral wire N is disconnected from the non-isolated power source MP (the switch can disconnect one of the live wire L and the neutral wire N from the non-isolated power source MP), one of the live wire L and the neutral wire N still can be electrically connected to the LED LD, so there is an AC potential difference between the LED LD and the conductive layer Sa, which can charge the first metal layer Sc1 and the second metal layer Sc2. In this case, if the above circuit does not have the capacitor CP, there must be a potential difference between the first metal layer Sc1 and the second metal layer Sc2 (because the size of the first metal layer Sc1 is different from that of the second metal layer Sc2). Thus, the above potential difference also exists between the positive electrode pin and the negative electrode pin of the LED LD. For the reason, if the potential difference between the positive electrode pin and the negative electrode pin of the LED LD is greater than 2.3V, the LED LD faintly glows, which cause the afterglow effect.

If the above circuit includes the capacitor CP, the AC potential difference can charge or discharge the capacitor CP without influencing the first metal layer Sc1 and the second metal layer Sc2. Accordingly, the capacitor CP can effectively eliminate the afterglow effect. On the contrary, if there is only a DC potential difference between the positive electrode pin and the negative electrode pin of the LED LD, the capacitor CP is open-circuited.

The embodiment just exemplifies the present invention and is not intended to limit the scope of the present invention; any equivalent modification and variation according to the spirit of the present invention is to be also included within the scope of the following claims and their equivalents.

It is worthy to point out that the currently available LED lighting devices will have obvious afterglow after being turned off. In addition, LED lighting devices with dimming function or temperature adjustment function (such as plant lamps, etc.) may have multiple lighting modules. When the user turns off one (or more) lighting modules, the user will find that this lighting module also incurs an afterglow effect and cannot be completely turned off. On the contrary, according to one embodiment of the present invention, the LED device with afterglow-proof function, which includes a common positive electrode, a common negative electrode and a LED lighting module. The common positive electrode is connected to the positive electrode of an external power source. The common negative electrode is connected to the negative electrode of the external power source. One end of the LED lighting module is connected to the common positive electrode and the other end of the LED lighting module is connected to the common negative electrode. The LED lighting module includes a plurality of LED lighting units connected to each other in series. Each of the LED lighting units includes a light source and a capacitor connected to each other in parallel. The above circuit design can effectively realize the afterglow-proof function in order to eliminate the afterglow effect of the LED lighting device, which can effectively improve the shortcomings of the prior art.

Also, according to one embodiment of the present invention, the circuit design of the LED lighting device can realize the afterglow-proof function so as to prevent the LED lighting device from the afterglow effect, which can effectively optimize the dimming function and the color temperature adjusting function of the LED lighting device. As a result, the LED lighting device can be more comprehensively in application and more flexible in use.

Further, according to one embodiment of the present invention, the circuit design of the LED lighting device can be realized by one or more LEDs connected to a capacitor in parallel in order to achieve the afterglow-proof function. Thus, the circuit design of the LED lighting device does not need an isolated power source or a relay, so the cost of the LED lighting device can be significantly reduced. Accordingly, the practicality of the LED lighting device can be effectively enhanced so as to meet actual requirements.

Moreover, according to one embodiment of the present invention, the circuit design of the LED lighting device can be realized by one or more LEDs connected to a capacitor in parallel. This circuit design can achieve the afterglow-proof function with a view to preventing the LED lighting device from the afterglow effect without decreasing the efficiency of the LED lighting device. Accordingly, the LED lighting device can operate in high efficiency, such that the power consumption of the LED lighting device can be reduced. In this way, the LED lighting device can conform to the future development trend.

Furthermore, according to one embodiment of the present invention, the design of the LED lighting device is simple, so the LED lighting device can achieve the desired technical effect without significantly increasing the cost. Therefore, the LED lighting device can satisfy the requirements of different applications. As previously stated, the LED lighting device according to the embodiments of the present invention can definitely achieve great technical effects.

Figure 3:
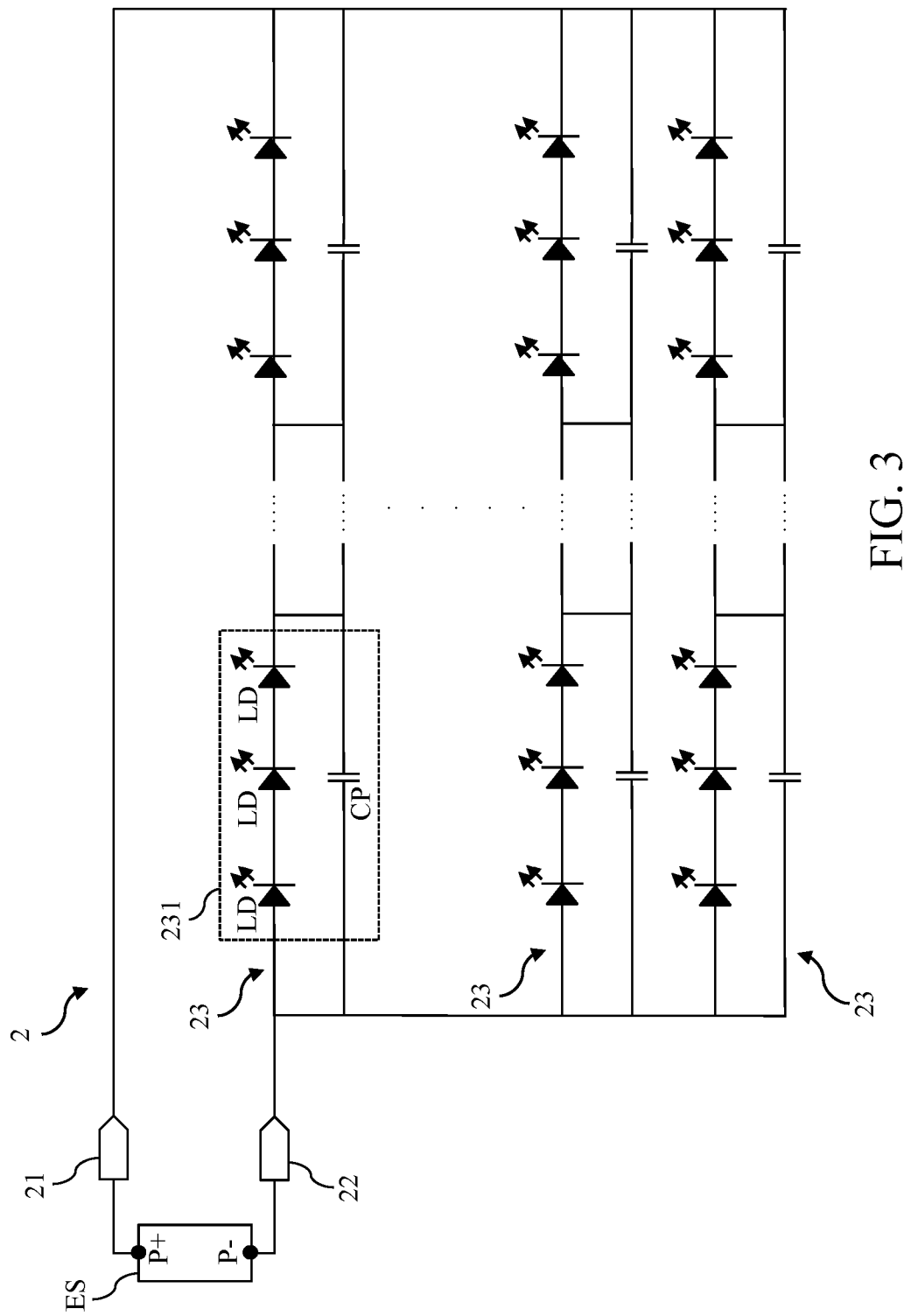
FIG. 3 is the circuit diagram of the LED lighting device with afterglow-proof function in accordance with another embodiment of the present invention.

Please refer to FIG. 3, which is the circuit diagram of the light-emitting diode (LED) lighting device with afterglow-proof function in accordance with another embodiment of the present invention. As shown in FIG. 2, the LED device 2 includes a common positive electrode 21, a common negative electrode 22 and a plurality of LED lighting modules 23.

The common positive electrode 21 is connected to the positive electrode P+ of an external power source ES. The common negative electrode 22 is connected to the negative electrode P− of the external power source ES. The common positive electrode 21 and the common negative electrode 22 of the LED lighting device 1 may be connected to the lamp holder in order to connect to the external power source ES. One end of each of the LED lighting modules 13 is connected to the common positive electrode 21 and the other end thereof is connected to the common negative electrode 22. Each of the LED lighting modules 23 includes a plurality of LED lighting units 231 connected to each other in series. Each of the LED lighting units 231 includes a light source and a capacitor CP connected to each other in parallel.

The above elements are similar to those of the previous embodiment, so will not be described herein again. The difference between the embodiment and the previous embodiment is that the light source includes three LEDs LD connected to each other in series and the capacitor CP is a multilayer ceramic capacitor. In addition, the capacitive reactance of the capacitor CP is less than the impedance of the LEDs in on state. In the embodiment, the quantity of the LEDs LD of the light source is an odd number. In another embodiment, the quantity of the LEDs LD of the light source is an even number. The embodiment is just for illustration; the quantity of the LEDs LD can be adjusted according to actual requirements.

Similarly, if the LEDs LD connected in series are connected to the capacitor CP in parallel, the capacitor CP can be consecutively switched between charging state and discharging state. Thus, if the capacitance of the capacitor CP makes the capacitive reactance of the capacitor CP is less than the impedance of the LEDs LD in on state, the current will pass through the capacitor CP instead of the LEDs LD. Accordingly, the LEDs LD will not incur the afterglow effect.

As described above, the LED lighting device 2 includes the common positive electrode 21, the common negative electrode 22 and the LED lighting modules 23. The common positive electrode 21 is connected to the positive electrode P+ of the external power source ES. The common negative electrode 22 is connected to the negative electrode P− of the external power source ES. One end of each of the LED lighting modules 23 is connected to the common positive electrode 21 and the other end thereof is connected to the common negative electrode 22. Each of the LED lighting modules 23 includes the LED lighting units 231 connected to each other in series. Each of the LED lighting units 231 includes the light source and the capacitor CP connected to each other in parallel, and the light source includes the LEDs LD. The above circuit design also can effectively realize the afterglow-proof function in order to eliminate the afterglow effect of the LED lighting device, which can effectively improve the shortcomings of the prior art.

Furthermore, the circuit design of the LED lighting device 2 can be realized by the LEDs LD connected to the capacitor CP in parallel in order to achieve the afterglow-proof function. Thus, the circuit design of the LED lighting device 2 does not need an isolated power source or a relay, so the cost of the LED lighting device 2 can be significantly reduced. Accordingly, the practicality of the LED lighting device 2 can be effectively enhanced so as to meet actual requirements. Further, the above circuit design can effectively optimize the dimming function and the color temperature adjusting function of the LED lighting device 2. Therefore, the LED lighting device 2 can be more comprehensively in application and more flexible in use. Via the above circuit design, the LED lighting device 2 can operate in high efficiency, such that the power consumption of the LED lighting device 2 can be reduced. In this way, the LED lighting device 2 can conform to the future development trend.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the LED device with afterglow-proof function, which includes a common positive electrode, a common negative electrode and a LED lighting module. The common positive electrode is connected to the positive electrode of an external power source. The common negative electrode is connected to the negative electrode of the external power source. One end of the LED lighting module is connected to the common positive electrode and the other end of the LED lighting module is connected to the common negative electrode. The LED lighting module includes a plurality of LED lighting units connected to each other in series. Each of the LED lighting units includes a light source and a capacitor connected to each other in parallel. The above circuit design can effectively realize the afterglow-proof function in order to eliminate the afterglow effect of the LED lighting device, which can effectively improve the shortcomings of the prior art.

Also, according to one embodiment of the present invention, the circuit design of the LED lighting device can realize the afterglow-proof function so as to prevent the LED lighting device from the afterglow effect, which can effectively optimize the dimming function and the color temperature adjusting function of the LED lighting device. As a result, the LED lighting device can be more comprehensively in application and more flexible in use.

Further, according to one embodiment of the present invention, the circuit design of the LED lighting device can be realized by one or more LEDs connected to a capacitor in parallel in order to achieve the afterglow-proof function. Thus, the circuit design of the LED lighting device does not need an isolated power source or a relay, so the cost of the LED lighting device can be significantly reduced. Accordingly, the practicality of the LED lighting device can be effectively enhanced so as to meet actual requirements.

Moreover, according to one embodiment of the present invention, the circuit design of the LED lighting device can be realized by one or more LEDs connected to a capacitor in parallel. This circuit design can achieve the afterglow-proof function with a view to preventing the LED lighting device from the afterglow effect without decreasing the efficiency of the LED lighting device. Accordingly, the LED lighting device can operate in high efficiency, such that the power consumption of the LED lighting device can be reduced. In this way, the LED lighting device can conform to the future development trend.

Furthermore, according to one embodiment of the present invention, the design of the LED lighting device is simple, so the LED lighting device can achieve the desired technical effect without significantly increasing the cost. Therefore, the LED lighting device can satisfy the requirements of different applications.

It will be apparent to those skilled in the art that various modifications and variations can be made to the disclosed embodiments. It is intended that the specification and examples be considered as exemplary only, with a true scope of the present invention being indicated by the following claims and their equivalents.

What is claimed is:

1. A light-emitting diode (LED) device with afterglow-proof function, comprising:

a common positive electrode connected to a positive electrode of an external power source;
a common negative electrode connected to a negative electrode of the external power source;
a LED lighting module; and
a substrate comprising a conductive layer connected to a grounding point, an isolating medium layer, a plurality of first metal layers connected to the common positive electrode and a plurality of second metal layers connected to the negative electrode, wherein the isolating medium layer is disposed on the conductive layer, and the first metal layers and the second metal layers are disposed on the isolating medium layer;
wherein the LED lighting module comprises a plurality of LED lighting units connected to each other in series, and each of the LED lighting units is corresponding to one of the first metal layers and one of the second metal layers, wherein each of the LED lighting units comprises a light source and a capacitor connected to each other in parallel, and a positive electrode pin and a negative electrode pin of the light source are respectively connected to the first metal layer and the second metal layer corresponding thereto, and one end of the capacitor is connected to the first metal layer corresponding thereto and another end of the capacitor is connected to the second metal layer corresponding thereto.

2. The LED device with afterglow-proof function as claimed in claim 1, wherein the light source comprises a plurality of LED connected to each other in series.

3. The LED device with afterglow-proof function as claimed in claim 2, wherein a capacitive reactance of the capacitor is less than an impedance of the LEDs in a on state.

4. The LED device with afterglow-proof function as claimed in claim 2, wherein a quantity of the LEDs is an even number.

5. The LED device with afterglow-proof function as claimed in claim 2, wherein a quantity of the LEDs is an odd number.

6. The LED device with afterglow-proof function as claimed in claim 1, wherein the light source is a LED.

7. The LED device with afterglow-proof function as claimed in claim 6, wherein a capacitive reactance of the capacitor is less than an impedance of the LED in a on state.

8. The LED device with afterglow-proof function as claimed in claim 1, wherein the capacitor is a multilayer ceramic capacitor.

9. The LED device with afterglow-proof function as claimed in claim 1, wherein the external power source is a utility power.

10. The LED device with afterglow-proof function as claimed in claim 1, wherein a quantity of the LED lighting units of the LED lighting module is greater than 3.

* * * * *